(12) United States Patent
Ooeda et al.

(10) Patent No.: US 9,202,503 B2
(45) Date of Patent: Dec. 1, 2015

(54) MAGNETIC MEDIA WITH A LOW MOLECULAR WEIGHT LUBRICATING LAYER FOR USE IN HEAD/MEDIA CONTACT DETECTION

(71) Applicant: HGST Netherlands B.V., Amsterdam (NL)

(72) Inventors: Yoshihiko Ooeda, Yokohama (JP); Hiroyuki Matsumoto, Chigasaki (JP); Sukefumi Ito, Odawara (JP); Yoko Saito, Ishioka (JP)

(73) Assignee: HGST Netherlands B.V., Amsterdam (NL)

( * ) Notice: Subject to any disclaimer, the term of this patent is extended or adjusted under 35 U.S.C. 154(b) by 61 days.

(21) Appl. No.: 13/742,286

(22) Filed: Jan. 15, 2013

(65) Prior Publication Data
US 2014/0198409 A1 Jul. 17, 2014

(51) Int. Cl.
*G11B 5/66* (2006.01)
*G11B 5/725* (2006.01)

(52) U.S. Cl.
CPC .................................. *G11B 5/725* (2013.01)

(58) Field of Classification Search
CPC .................................. G11B 5/725; G11B 5/82
See application file for complete search history.

(56) References Cited

U.S. PATENT DOCUMENTS

| 6,099,937 | A | 8/2000 | Gui et al. |
| 7,199,087 | B2 | 4/2007 | Osawa et al. |

(Continued)

FOREIGN PATENT DOCUMENTS

| JP | 62283189 | 12/1987 |
| JP | 02-192742 | 7/1990 |

(Continued)

OTHER PUBLICATIONS

Waltman et al., "The role of configuration entropy in boundary lubricant based on the n-perfluoropropylene oxide main chain structure", Tribol. Lett., vol. 33, Dec. 4, 2008, pp. 137-142.*

(Continued)

*Primary Examiner* — Holly Rickman
(74) *Attorney, Agent, or Firm* — Zilka-Kotab, PC (57) ABSTRACT

According to various embodiments, a lubricating layer for providing lubrication to a magnetic recording medium includes a perfluoropolyether (PFPE) represented by: $X-CF_2CF_2O(C_3F_6O)_mCF_2CF_2-X$, wherein m is in a range from 4 to 8 on average, and wherein X is $$-CH_2OCH_2CHCH_2OH.$$
$$\quad\quad\quad\quad\quad\;\;|$$
$$\quad\quad\quad\quad\quad\;\;OH$$

This lubricating layer may be used in a magnetic disk, which includes a recording layer positioned above a nonmagnetic substrate, a protective film layer positioned above the recording layer, and the lubricating layer positioned above the protective film layer. In another embodiment, a method for forming a magnetic disk includes forming a recording layer above a nonmagnetic substrate, forming a protective film layer above the recording layer, and forming a lubricating layer above the protective film layer, the lubricating layer comprising a perfluoropolyether (PFPE) represented by: $X-CF_2CF_2O(C_3F_6O)_mCF_2CF_2-X$, wherein m is in a range from 4 to 8 on average, and wherein X is $$-CH_2OCH_2CHCH_2OH.$$
$$\quad\quad\quad\quad\quad\;\;|$$
$$\quad\quad\quad\quad\quad\;\;OH$$

12 Claims, 5 Drawing Sheets

(56) References Cited

U.S. PATENT DOCUMENTS

| | | |
|---|---|---|
| 7,244,521 B2 | 7/2007 | Liu et al. |
| 7,361,380 B1 | 4/2008 | Liu et al. |
| 7,531,485 B2 | 5/2009 | Hara et al. |
| 8,711,508 B2 * | 4/2014 | Kurita et al. .................... 360/55 |
| 2004/0092406 A1 * | 5/2004 | Osawa et al. ................. 508/111 |
| 2009/0059416 A1 | 3/2009 | Okada et al. |
| 2010/0265618 A1 | 10/2010 | Boutaghou et al. |
| 2011/0293965 A1 * | 12/2011 | Saito et al. .................... 428/800 |
| 2012/0127599 A1 | 5/2012 | Shimokawa et al. |

FOREIGN PATENT DOCUMENTS

| | | |
|---|---|---|
| JP | 08/016158 | 1/1996 |
| JP | 0816158 | 1/1996 |
| JP | 09/282642 | 10/1997 |
| JP | 9282601 A | 10/1997 |
| JP | 2000-315314 | 11/2000 |
| JP | 2003027079 A | 1/2003 |
| JP | 200607173 | 3/2006 |
| JP | 2006070173 | 3/2006 |
| JP | 2006/228422 | 8/2006 |
| JP | 2010168512 A | 8/2010 |
| JP | 2010184995 A | 8/2010 |
| JP | 2010257502 A | 11/2010 |
| JP | 2011096333 A | 5/2011 |
| JP | 2012027989 A | 2/2012 |
| JP | 2012089225 A | 5/2012 |
| WO | 2009013785 A1 | 1/2009 |
| WO | 2012149085 A1 | 11/2012 |

OTHER PUBLICATIONS

Kobayashi et al., "HDI Technology for Perpendicular Magnetic Recording Media," Magnetic Recording Media, vol.52, No. 2, Fuji Electric Review, 2011, pp. 51-56.

Statement of Relevance of Non-Translated Foreign Document JP2003027079.

Statement of Relevance of Non-Translated Foreign Document JP201084995.

Statement of Relevance of Non-Translated Foreign Document JP201109633.

Statement of Relevance of Non-Translated Foreign Document WO2009013785.

* cited by examiner

MAGNETIC MEDIA WITH A LOW MOLECULAR WEIGHT LUBRICATING LAYER FOR USE IN HEAD/MEDIA CONTACT DETECTION

FIELD OF THE INVENTION

The present invention relates to a magnetic recording medium, and more particularly to a magnetic recording medium having a low molecular weight lubricating layer for use in head-to-media contact detection.

BACKGROUND

Reducing magnet spacing (actual physical distance between a magnetic head read/write element and a magnetic layer of a magnetic disk) is useful for increasing recording density in magnetic storage device. Reducing the clearance (a gap distance between the very lowest point on the magnetic head and the upper surface of the magnetic disk) assists in achieving this reduction. Very precise contact detection is essential to achieve a clearance of anywhere from 1 nm or less. According to conventional methods, very precise contact detection and clearance control may be achieved using a heater element and a head-disk interface (HDI) contact sensor element positioned near a contact point on the magnetic head. However, the sensor is very sensitive in such methods, so minute interactions between the magnetic head and any lubricant applied to the upper surface of the magnetic disk or magnetic recording medium produces adverse effects, such as causing errors in determining contact between the head and the disk.

A perfluoropolyether (PFPE) derived from FOMBLIN Z (a brand name) produced by Solvay Solexis, for instance, is commonly used as a conventional disk lubricant, but the molecular weight of commercially available lubricants is distributed over a wide range and varies according to the lots of lubricant produced.

It has therefore been proposed to use only an extracted component having a molecular weight in a suitable range from this wider overall range, as disclosed in Japanese Patent Publication No. 12-315314A and U.S. Pat. No. 6,099,937. In Japanese Patent Publication No. 9-282642A and Japanese Patent Publication No. 18-228422A, it has been proposed to use a lubricant employing one or more types of perfluoropolyether (PFPE) having different terminal functional groups as a lubricant for improving bonding with the magnetic disk. Furthermore, in Japanese Patent Publication No. 18-70173A, a PFPE having an average of 1.0 to 5.0 hydroxyl groups in each molecule has been proposed as a lubricant to take account for planarity of the lubricant film and strong bonding force with the magnetic disk.

However, the abovementioned lubricant produces strong interactions between the lubricant and the magnetic head when contact between the head and the disk is determined, which means that contact is often erroneously detected and it is difficult to ensure very precise and stable contact determination. Furthermore, when a thickness of the lubricant film is reduced to a level which does not affect the contact determination, reliability is impaired due to other factors, such as corrosion resistance of the magnetic disk.

On the other hand, Japanese Patent Office (JPO) Publication No. 2008-16158A and JPO Publication No. 2002-192742A disclose technology in which a contact sensor element is fitted to a magnetic head, but these contact sensor have not been useful in providing an ideal combination, when the magnetic disk is taken into account, for effectively employing these contact sensors.

Accordingly, a thin film of lubricant is needed in order to reduce interactions between a magnetic head employing a contact sensor and a lubricant on the upper surface of a magnetic disk when any of the above described methods are used. Film-thinning referred to herein includes (1) simply reducing the thickness of the lubricant film; and (2) selecting a lubricant in which the lubricant molecules are capable of attaching/bonding at a low level to the surface of the magnetic disk in terms of the three-dimensional structure. As a result, interactions between the head and the disk may be restricted.

However, film thinning achieved by the methods described above involve risks in terms of reliability of the HDI, such as environment/contamination resistance and reduced lubricity (wear resistance).

SUMMARY

According to one embodiment, a magnetic disk includes a recording layer positioned above a nonmagnetic substrate; a protective film layer positioned above the recording layer; and a lubricating layer positioned above the protective film layer, the lubricating layer comprising a perfluoropolyether (PFPE) represented by: $X-CF_2CF_2O(C_3F_6O)_mCF_2CF_2-X$, wherein m is in a range from 4 to 8 on average, and wherein X is According to another embodiment, a lubricating layer for providing lubrication to a magnetic recording medium includes a perfluoropolyether (PFPE) represented by: $X-CF_2CF_2O(C_3F_6O)_mCF_2CF_2-X$, wherein m is in a range from 4 to 8 on average, and wherein X is In yet another embodiment, a method for forming a magnetic disk includes forming a recording layer above a nonmagnetic substrate; forming a protective film layer above the recording layer; and forming a lubricating layer above the protective film layer, the lubricating layer comprising a perfluoropolyether (PFPE) represented by: $X-CF_2CF_2O(C_3F_6O)_mCF_2CF_2-X$, wherein m is in a range from 4 to 8 on average, and wherein X is Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
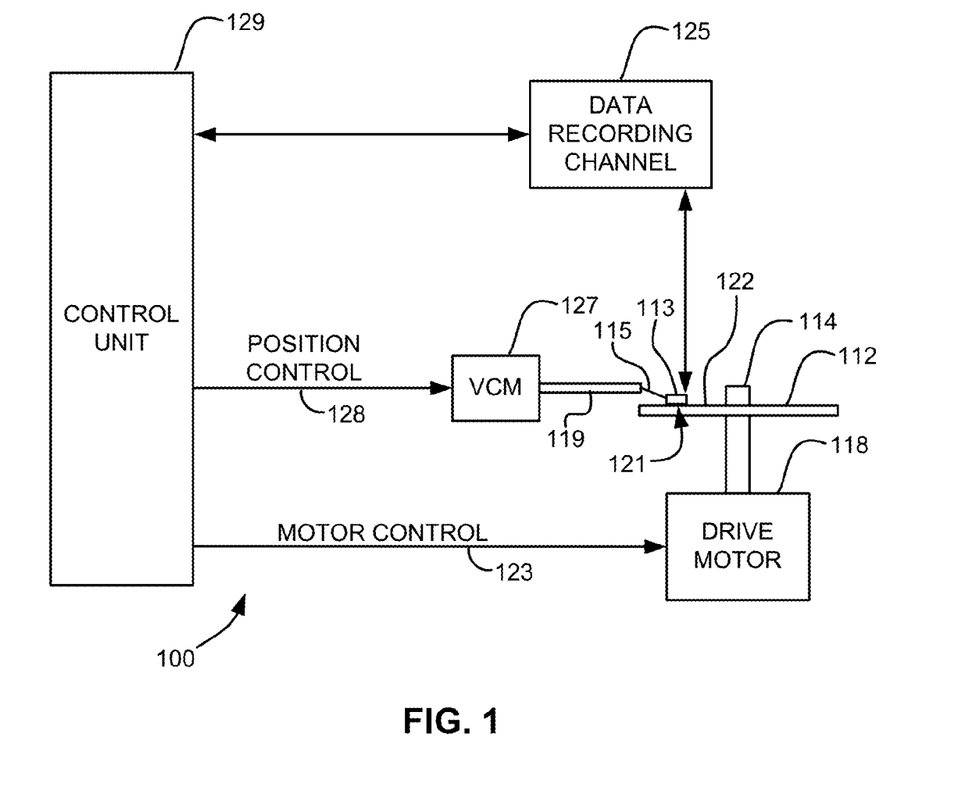
FIG. 1 is a simplified drawing of a magnetic recording disk drive system.

According to one general embodiment, a magnetic disk includes a recording layer positioned above a nonmagnetic substrate; a protective film layer positioned above the recording layer; and a lubricating layer positioned above the protective film layer, the lubricating layer comprising a perfluoropolyether (PFPE) represented by: X—$CF_2CF_2O(C_3F_6O)_mCF_2CF_2$—X, wherein m is in a range from 4 to 8 on average, and wherein X is According to another general embodiment, a lubricating layer for providing lubrication to a magnetic recording medium includes a perfluoropolyether (PFPE) represented by: X—$CF_2CF_2O(C_3F_6O)_mCF_2CF_2$—X, wherein m is in a range from 4 to 8 on average, and wherein X is In yet another general embodiment, a method for forming a magnetic disk includes forming a recording layer above a nonmagnetic substrate; forming a protective film layer above the recording layer; and forming a lubricating layer above the protective film layer, the lubricating layer comprising a perfluoropolyether (PFPE) represented by: X—$CF_2CF_2O(C_3F_6O)_mCF_2CF_2$—X, wherein m is in a range from 4 to 8 on average, and wherein X is Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Figure 2:
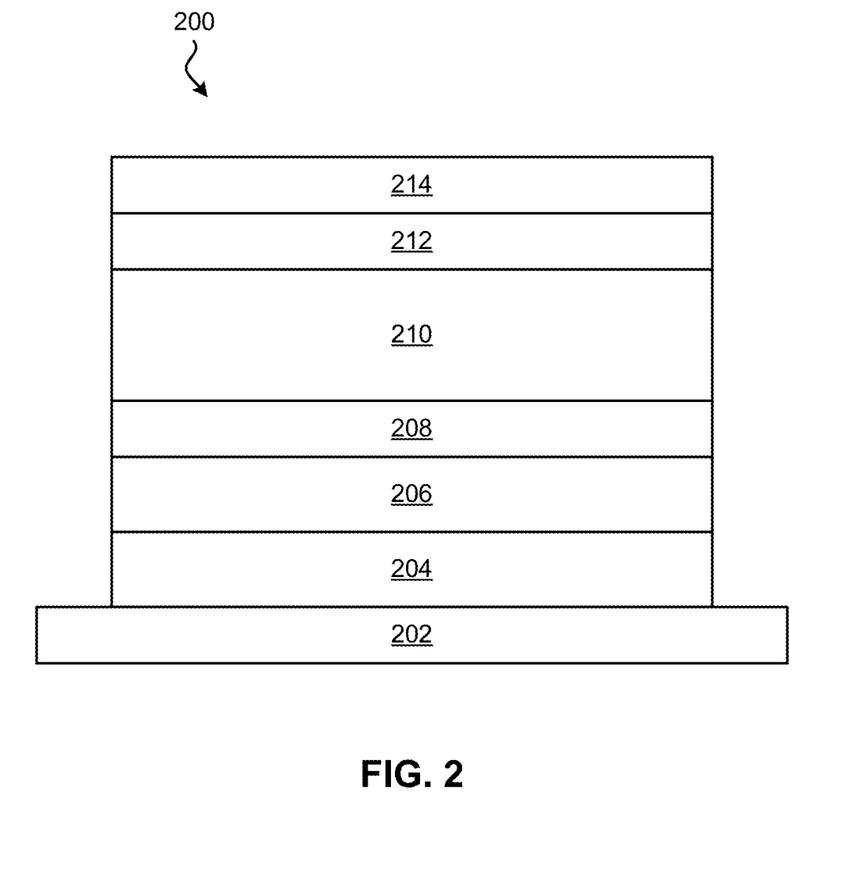
FIG. 2 is a schematic diagram showing a structure of a magnetic recording medium, according to one embodiment.

According to one embodiment, as shown in FIG. 2, a magnetic recording disk 200 comprises a recording layer 210, a protective film layer 212, and a lubricating layer 214 positioned above a nonmagnetic substrate 202. The lubricating layer 214 may comprise one or more lubricants. In one approach, the lubricant may be a perfluoropolyether (PFPE) represented by formula (A) having an average molecular weight in a range between about 1200 g/mol to about 1700 g/mol.

X—$CF_2CF_2O(C_3F_6O)_mCF_2CF_2$—X        Formula (A)

where X is with m being in a range from about 4 to about 8 on average.

In further embodiments, the magnetic recording disk 200 may also comprise an underlayer 208 positioned below the recording layer 210, one or more soft magnetic underlayers 206 positioned below the underlayer 208, and an adhesion layer 204 positioned below the one or more soft magnetic underlayers 206. All of these layers may be formed above the nonmagnetic substrate 202, which may comprise glass in one embodiment. Each of the layers of the magnetic recording disk 200, besides the lubricating layer 214, may comprise materials known in the art to be suitable for the particular layers of the magnetic recording disk.

According to another embodiment, a magnetic recording device, such as the magnetic recording disk drive system 100 shown in FIG. 1, may comprise the magnetic recording medium described above, a magnetic head, and a spindle motor for rotating the magnetic medium, the magnetic head comprising: a write element, a read element, a heater element for adjusting a clearance between the magnetic medium and the head, and a contact sensor element for detecting contact between the magnetic head and the magnetic recording medium.

If the weight average molecular weight of the lubricant represented by formula (A) is less than about 1200, the lubricant may evaporate when the temperature rises during usage, depending on the operating conditions and environment surrounding the magnetic recording device, and spin-off or scattering of the lubricant is likely to be produced when the magnetic disk is rotating at above about 5000 rpm, and the lubricant film thickness is drastically reduced.

Furthermore, if the weight average molecular weight exceeds about 1700, the lubricant present on the magnetic disk becomes bulky and there are considerable interactions between the magnetic head and the lubricant. This adversely affects contact detection and promotes a phenomenon whereby the lubricant adheres to the magnetic head.

According to the embodiments described herein, a magnetic recording device which employs a magnetic disk comprising a magnetic layer, a protective layer and a lubricating layer on a disk substrate, may be characterized in that a flying height of the magnetic head may be about 3 nm or less. The device may also include a mechanism whereby the flying height is controlled using a thermal flying height control head in which a heater is provided near or within a head element, and a mechanism in which a contact sensor employed to determine contact between the head and the disk is provided near or within the head element.

According to one approach, a lubricant represented by the formula (A) having a low molecular weight may be used in a lubricating layer of a magnetic recording medium, and as a result, interactions with a magnetic head therebetween are reduced, contact is detected using a high-precision heater element and contact sensor element, and a clearance between the magnetic head and the magnetic recording medium is controlled. In addition, by using a low-molecular weight lubricant, it is possible to limit the risk of corrosion and wear due to film thinning, by increasing the rate of coverage of the magnetic disk surface, and the magnetic recording density may be increased due to the reduced clearance.

Several examples are presented below as a way of describing embodiments of the present invention. These examples are not meant to be limiting on the invention in any way, and are presented for exemplary purposes only.

The following were used in the examples below: D40H 2k (number average molecular weight: 1516 g/mol) represented by the formula (A) was used as a PFPE (I); D40H 2k (number average molecular weight: 2029 g/mol) was used as PFPE (II); D40H 4k (number average molecular weight: 3843 g/mol) was used as PFPE (III); commercially available Z TETRAOL (a brand name) produced by Solvay Solexis (number average molecular weight: 2155 g/mol) represented by formula (B) was used as PFPE (IV); and ZTMD (a brand name) produced by Hitachi Global Storage Technologies (HGST) (number average molecular weight: 2661 g/mol) represented by formula (C) was used as PFPE (V).

Formula (B)

where X is and X=X'.

Formula (C)

where A is

T is and
Z is $CF_2O-[(CF_2CF_2O)_m-(CF_2O)_n]-CF_2-$.

For the magnetic disk, films were formed in succession by sputtering, on a glass substrate having a diameter of about 2.5 inches, to produce a structure as shown in FIG. 2, after which a diamond-like carbon (DLC) film was formed to a thickness of about 3 nm. The abovementioned five types of PFPE film were formed on the DLC film by dipping to form the lubricating layer of the five examples.

Figure 3:
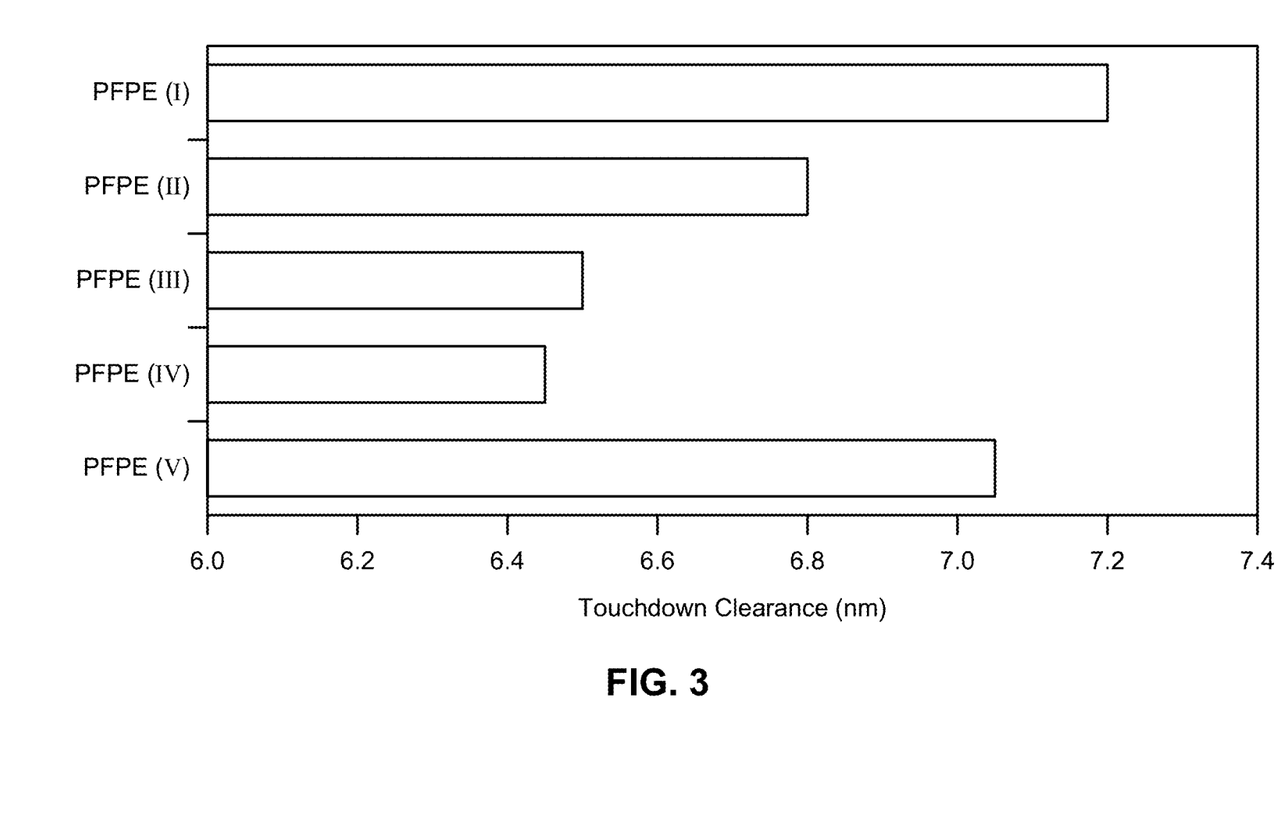
FIG. 3 shows a comparison of distance until contact between a magnetic head and a magnetic recording disk occurs using different lubricating layer materials.

The flying clearance of the magnetic head above the magnetic recording medium was measured, and the results are shown in FIG. 3. The measurements were carried out by steadily applying a voltage to the heater element provided in the magnetic head as it was flying, and the distance until contact between the head and the disk (touch down clearance) was calculated from the applied voltage. The surface of the magnetic head expanded due to the heat from the heater and soon reached the lubricating film on the very surface of the magnetic disk. Interactions increased and a large amount of vibration was produced when voltage was applied to the heater element. Using a piezoelectric element sensor, contact was defined as the point where the vibration was twice the vibration value when zero voltage was applied. Accordingly, when the distance until contact between the head and the disk became longer, the less bulky the lubricant film and the lower the attitude of the lubricant film on the magnetic disk, so the flying height of the magnetic head could be reduced proportionally. The speed of rotation of the magnetic disk during these measurements was 5400 rpm and the film thickness of each lubricant was adjusted to 0.1 nm.

It is clear from the measurement results that the longest contact distance was shown with the lubricant represented by Formula (A) which is PFPE (I) which has a small molecular weight.

Figure 4:
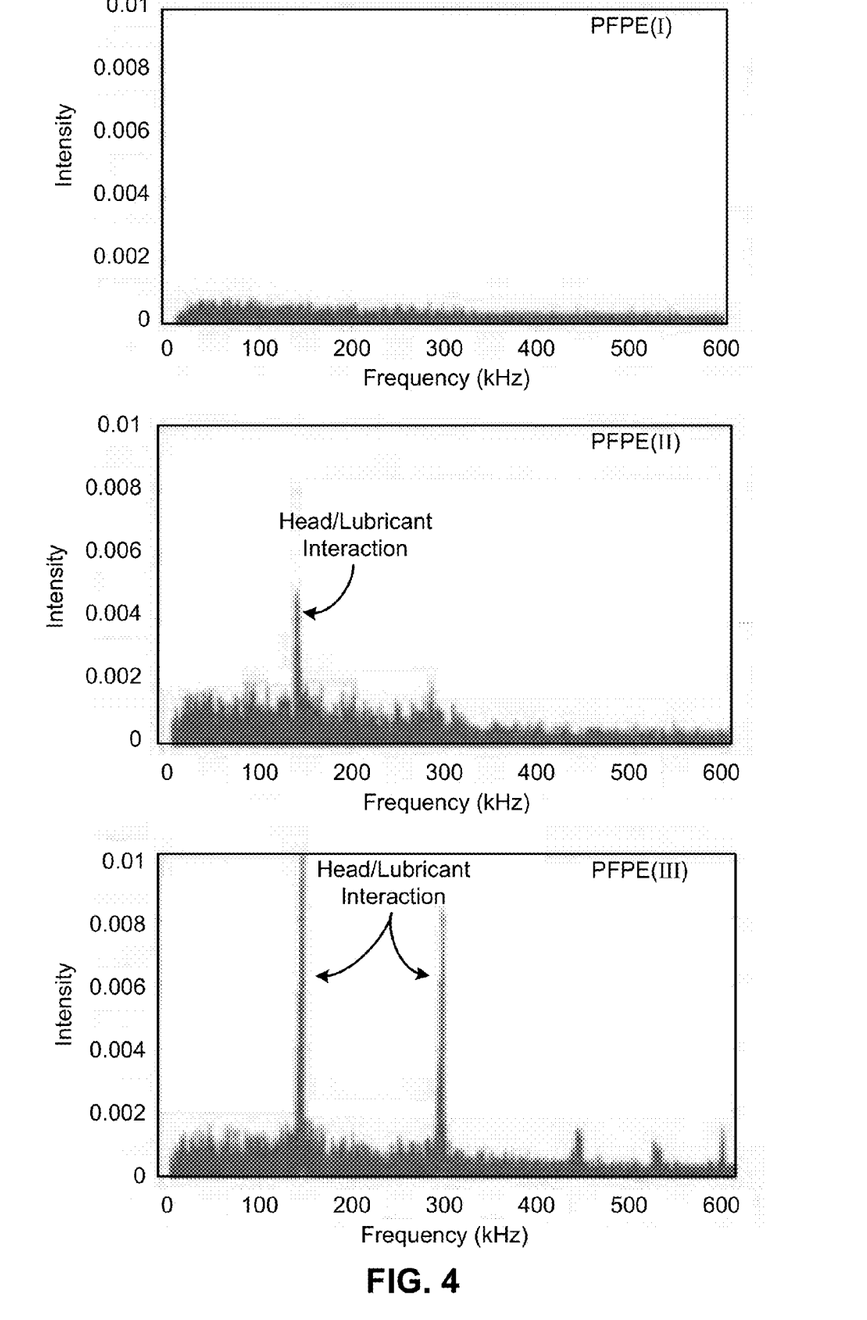
FIG. 4 shows a comparison of contact sensor signals at a point where a flying height clearance is 0.2 nm.

In addition, the interactions between the magnetic head and the lubricant film were investigated using the contact sensor. For measurements, contact signals with the flying clearance at 1.0 nm, 0.6 nm, and 0.2 nm were compared using the same magnetic head. When there were minute interactions between the magnetic head and the lubricant film, temperature changes occurred in the contact sensor and a corresponding signal peak was observed. The speed of rotation of the magnetic disk during these measurements was 5400 rpm and the film thickness of each lubricant was adjusted to about 0.12 nm. As shown in FIG. 4, it was confirmed from these results that with PFPE (I), no signal was seen from the contact sensor up to a flying clearance of about 0.2 nm, which was a point very close to the point of contact between the magnetic head and the disk, and interactions were very small. It was clear from this finding that it had been possible to limit the adverse effects of interactions with the lubricant when contact was detected by the contact sensor.

Meanwhile, reductions in corrosion resistance and wear resistance, which are issues when the lubricant film is thinned, were investigated. For the corrosion resistance, the magnetic disk was exposed for a prescribed time under conditions of 60° C. and relative humidity of 90%, after which the number of corroded locations was counted using an optical surface analyzer (OSA). When the number of corroded locations on the surface of the magnetic disk was 2000 or greater, this was judged as "X," and below this was judged as "0."

The wear resistance test was carried out under conditions promoting wear of the magnetic head by applying a prescribed voltage above the applied voltage at which the head and the disk make contact to the heater element in the magnetic head. The wear was assessed by observing the surface of the magnetic head one hour after the test under a scanning electron microscope. When wear marks were seen in the protective film on the surface of the magnetic head element, this was judged as "X," and when no such marks were seen, this was judged as "O."

The results of evaluating the corrosion resistance and wear resistance of the lubricants are shown in Table 1, above. Each measurement is given in nanometers, ±0.1 nm. In terms of corrosion resistance, good results were demonstrated with PFPE(I) even when the film was only about 0.8 nm thick. On the other hand, it was clear that the corrosion resistance was inadequate with PFPE (III) even when the film was 1.1 nm thick. This showed the dependency of the corrosion resistance results on the molecular weight for the lubricant represented by Formula (A). Furthermore, good results were seen in terms of wear resistance in all cases with the lubricant represented by Formula (A).

These results indicate that when the lubricant represented by Formula (A) is used, the lubricant film is present at a low position on the surface of the magnetic disk, interactions with the magnetic head are reduced, and corrosion resistance is improved due to an increased rate of coverage.

According to one embodiment, a lubricant represented by Formula (A) having a low molecular weight is used in the lubricating layer of a magnetic recording medium, and as a result, interactions with the magnetic head are reduced, contact is detected using a high-precision thermal fly-height control (TFC) or TFC and an embedded contact sensor (ECS), and the clearance is controlled.

In addition, by using a low-molecular weight lubricant, it is possible to limit the risk of reduced corrosion resistance and wear resistance due to film thinning, by increasing the rate of coverage of the magnetic disk surface, and the magnetic recording density may be increased due to the reduced clearance.

Figure 5:
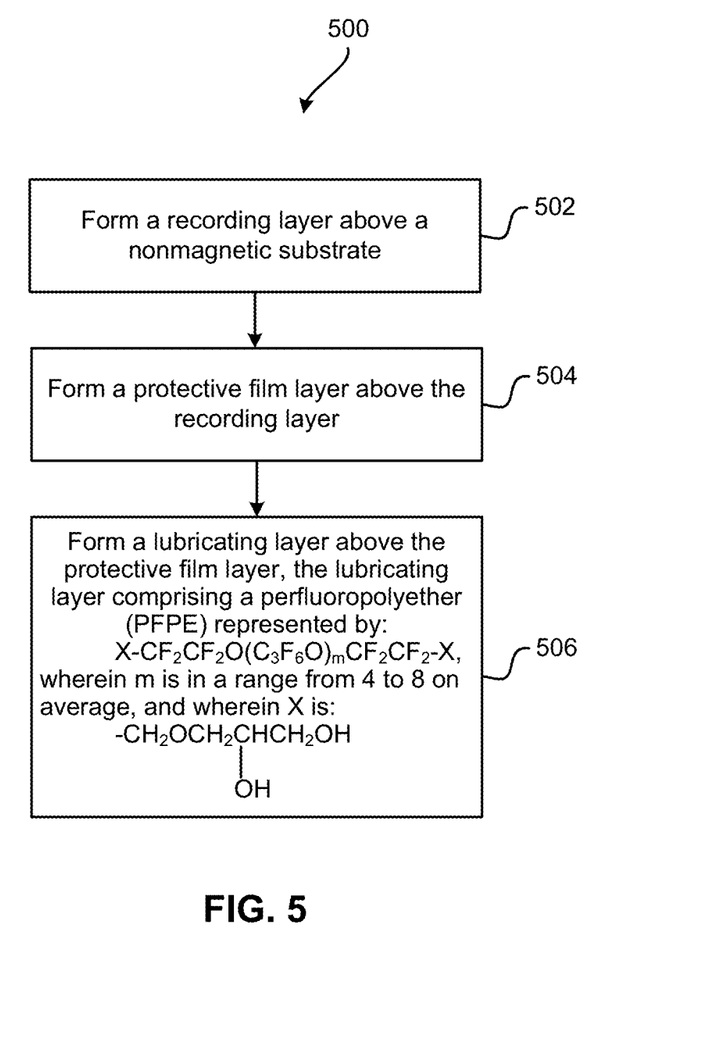
FIG. 5 is a flowchart of a method, according to one embodiment.

FIG. 5 shows a method 500 for forming a magnetic recording medium in accordance with one embodiment. As an option, the present method 500 may be implemented to construct structures such as those shown in FIGS. 1-4. Of course, however, this method 500 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In any of the operations described below, a layer may be formed using any formation technique known in the art, such as sputtering, plating, atomic layer deposition (ALD), chemical vapor deposition (CVD), plasma-enhanced vapor deposition (PECVD), etc. Furthermore, when not specifically described, each layer may be formed to a thickness suitable for operation of the magnetic recording medium in a magnetic data storage system, as known in the art.

In operation 502, a recording layer is formed above a nonmagnetic substrate. Additional layers may be formed prior to forming the recording layer, such as underlayers, adhesive layers, planarization layers, et. The recording layer may comprise any suitable material known in the art, such as magnetic materials, ferromagnetic materials, Co-based alloys, such as CoFe, CoFePt, etc., and other suitable materials.

TABLE 1

| | Lubricant | | | | | | | |
|---|---|---|---|---|---|---|---|---|
| | PFPE(I) | | PFPE(II) | | PFPE(III) | | PFPE(V) | |
| Thickness | 0.8 nm | 1.1 nm | 0.8 nm | 1.1 nm | 0.8 nm | 1.1 nm | 0.8 nm | 1.1 nm |
| Corrosion Robustness | ○ | ○ | X | ○ | X | X | X | X |
| Wear Robustness | | ○ | | ○ | | ○ | | X |

The nonmagnetic substrate may comprise any suitable material, such as glass, silicon, or other materials known in the art.

In operation 504, a protective film layer is formed above the recording layer. The protective film may comprise any suitable material known in the art, such as carbon-based alloys, diamond-like carbon (DLC), SiN, and other suitable materials.

In operation 506, a lubricating layer is formed above the protective film layer, the lubricating layer comprising a perfluoropolyether (PFPE) represented by Formula (A).

According to one embodiment, the lubricating layer may have an average molecular weight in a range from about 1000 g/mol to about 1800 g/mol, and in a further embodiment, in a range from about 1200 g/mol to about 1700 g/mol, and in an even further embodiment, between about 1400 g/mol and about 1500 g/mol.

In another approach, the lubricating layer may be formed with a thickness in a range from about 0.8 nm to about 1.1 nm, such as about 0.9 nm to about 1.0 nm.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic disk, comprising:
   a recording layer positioned above a nonmagnetic substrate;
   a protective film layer positioned above the recording layer; and
   a lubricating layer positioned above the protective film layer, the lubricating layer comprising a plurality of perfluoropolyether (PFPE) lubricants represented by:
   X—CF$_2$CF$_2$O(C$_3$F$_6$O)$_m$CF$_2$CF$_2$—X, wherein an average value of m is in a range from 4 to 8, wherein X is wherein the lubricating layer has a thickness of about 0.1 nm.

2. The magnetic disk as recited in claim 1, wherein the plurality of PFPE lubricants has an average molecular weight in a range from about 1400 g/mol to about 1500 g/mol.

3. The magnetic disk as recited in claim 1, wherein the plurality of PFPE lubricants has an average molecular weight of about 1500 g/mol.

4. A magnetic data storage system, comprising:
   at least one magnetic head comprising at least one of: a write element and a read element;
   a magnetic disk comprising:
      a recording layer positioned above a nonmagnetic substrate,
      a protective film layer positioned above the recording layer, and
      a lubricating layer positioned above the protective film layer, the lubricating layer comprising a plurality of perfluoropolyether (PFPE) lubricants represented by:
   X—CF$_2$CF$_2$O(C$_3$F$_6$O)$_m$CF$_2$CF$_2$—X, wherein an average value of m is in a range from 4 to 8, and wherein X is wherein the lubricating layer has a thickness of about 0.1 nm;
   a drive mechanism for passing the magnetic disk over the at least one magnetic head;
   a heater element for adjusting a clearance between the at least one magnetic head and the magnetic disk;
   a contact sensor element for detecting contact between the at least one magnetic head and the magnetic disk; and
   a controller electrically coupled to the at least one magnetic head for controlling operation of the at least one magnetic head.

5. The magnetic data storage system as recited in claim 4, wherein a flying height of the magnetic head above the magnetic disk is in a range from about 0.2 nm to about 3 nm.

6. The magnetic data storage system as recited in claim 5, wherein the flying height of the magnetic head above the magnetic disk is in a range between about 0.2 nm to about 1.0 nm.

7. The magnetic data storage system as recited in claim 4, wherein the contact sensor element is an embedded contact sensor (ECS), wherein the heater element is a thermal fly-height control (TFC) element.

8. A lubricating layer for providing lubrication to a magnetic recording medium, the lubricating layer comprising a plurality of perfluoropolyether (PFPE) lubricants each represented by:
   X—CF$_2$CF$_2$O(C$_3$F$_6$O)$_m$CF$_2$CF$_2$—X, wherein an average value of m is in a range from 4 to 8, and wherein X is wherein the plurality of PFPE lubricants has an average molecular weight in a range from about 1200 g/mol to about 1700 g/mol,
   wherein the lubricating layer has a thickness of about 0.1 nm.

9. The lubricating layer as recited in claim 8, wherein the plurality of PFPE lubricants has an average molecular weight in a range from about 1400 g/mol to about 1500 g/mol.

10. The lubricating layer as recited in claim 8, wherein the plurality of PFPE lubricants has an average molecular weight of about 1500 g/mol.

11. The magnetic disk as recited in claim 4, wherein the PFPE has a molecular weight in a range from about 1200 g/mol to about 1700 g/mol.

12. The magnetic disk as recited in claim 4, wherein the PFPE has a molecular weight in a range from about 1400 g/mol to about 1500 g/mol.

* * * * *